(12) United States Patent
Carthew et al.

(10) Patent No.: US 11,780,606 B2
(45) Date of Patent: Oct. 10, 2023

(54) LANDING PLATFORM INCLUDING POSITIONING ARMS FOR ENGAGING AN UNMANNED AERIAL VEHICLE

(71) Applicant: Ford Global Technologies, LLC, Dearborn, MI (US)

(72) Inventors: James Carthew, Dearborn, MI (US); Patrick Ellis, Dearborn, MI (US); Aditya Singh, Dearborn, MI (US)

(*) Notice: Subject to any disclaimer, the term of this patent is extended or adjusted under 35 U.S.C. 154(b) by 224 days.

(21) Appl. No.: 16/754,809

(22) PCT Filed: Oct. 16, 2017

(86) PCT No.: PCT/US2017/056760
§ 371 (c)(1),
(2) Date: Apr. 9, 2020

(87) PCT Pub. No.: WO2019/078812
PCT Pub. Date: Apr. 25, 2019

(65) Prior Publication Data
US 2020/0239161 A1 Jul. 30, 2020

(51) Int. Cl.
*B64F 1/22* (2006.01)
*B64C 39/02* (2006.01)
*B64F 1/32* (2006.01)
*B64F 1/36* (2017.01)
*B64U 10/13* (2023.01)

(52) U.S. Cl.
CPC .......... *B64F 1/22* (2013.01); *B64C 39/024* (2013.01); *B64F 1/32* (2013.01); *B64F 1/364* (2013.01); *B64U 10/13* (2023.01)

(58) Field of Classification Search
CPC .... B64F 1/22; B64F 1/32; B64F 1/364; B64C 39/024; B64C 2201/027

USPC ...................................... 244/144 R
See application file for complete search history.

(56) References Cited

U.S. PATENT DOCUMENTS

| | | | | |
|---|---|---|---|---|
| 3,149,803 | A * | 9/1964 | Petrides | B64C 39/022 244/17.23 |
| 4,806,066 | A | 2/1989 | Rhodes et al. | |
| 6,764,373 | B1 | 7/2004 | Osawa et al. | |
| 9,290,277 | B2 * | 3/2016 | You | B64F 1/18 |
| 9,704,409 | B2 * | 7/2017 | Prakash | B64C 39/024 |
| 9,845,165 | B2 * | 12/2017 | Michalski | G08G 5/0013 |
| 10,112,712 | B1 * | 10/2018 | Gentry | B60L 53/52 |
| 10,407,182 | B1 * | 9/2019 | Alcorn | B64F 1/125 |

(Continued)

FOREIGN PATENT DOCUMENTS

WO 2016/166366 A1 10/2016

OTHER PUBLICATIONS

International Search Report of the International Searching Authority for PCT/US2017/056760 dated Jan. 8, 2018.

*Primary Examiner* — Brady W Frazier
(74) *Attorney, Agent, or Firm* — Brandon Hicks; Eversheds Sutherland (US) LLP

(57) ABSTRACT

Example positioning systems and methods are described. In one implementation, a landing platform includes a base having an aperture and multiple positioning arms attached to the base. Each of the multiple positioning arms can rotate between an unlocked position and a locked position. Additionally, each of the multiple positioning arms are configured to engage a positioning ring on an unmanned aerial vehicle (UAV) and further configured to reposition the UAV on the base.

16 Claims, 7 Drawing Sheets

(56) References Cited

U.S. PATENT DOCUMENTS

| | | | |
|---|---|---|---|
| 10,439,550 B1* | 10/2019 | Goodman | F16M 11/046 |
| 2004/0167682 A1* | 8/2004 | Beck | B60K 17/356 |
| | | | 701/2 |
| 2011/0068224 A1 | 3/2011 | Kang et al. | |
| 2012/0139468 A1 | 6/2012 | Pettey | |
| 2014/0032034 A1 | 1/2014 | Raptopoulos et al. | |
| 2016/0196756 A1 | 7/2016 | Prakash et al. | |
| 2016/0376031 A1 | 12/2016 | Michalski et al. | |
| 2017/0316701 A1* | 11/2017 | Gil | B64D 1/00 |

* cited by examiner

LANDING PLATFORM INCLUDING POSITIONING ARMS FOR ENGAGING AN UNMANNED AERIAL VEHICLE

TECHNICAL FIELD

The present disclosure relates to systems and methods that manage the landing and positioning of an unmanned aerial vehicle (UAV).

BACKGROUND

Landing an unmanned aerial vehicle (UAV) at a specific location can be difficult. Precise landing locations are hindered by turbulence generated by the air displaced by the UAV's propellers and reflected by the landing surface. If the UAV is landing on a moving surface, precision landings become more difficult. In many situations, a UAV must be precisely positioned to successfully load/unload payload, attach charging systems, and the like. Thus, it is necessary to properly position a UAV on a landing surface to support loading/unloading payload and other activities.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
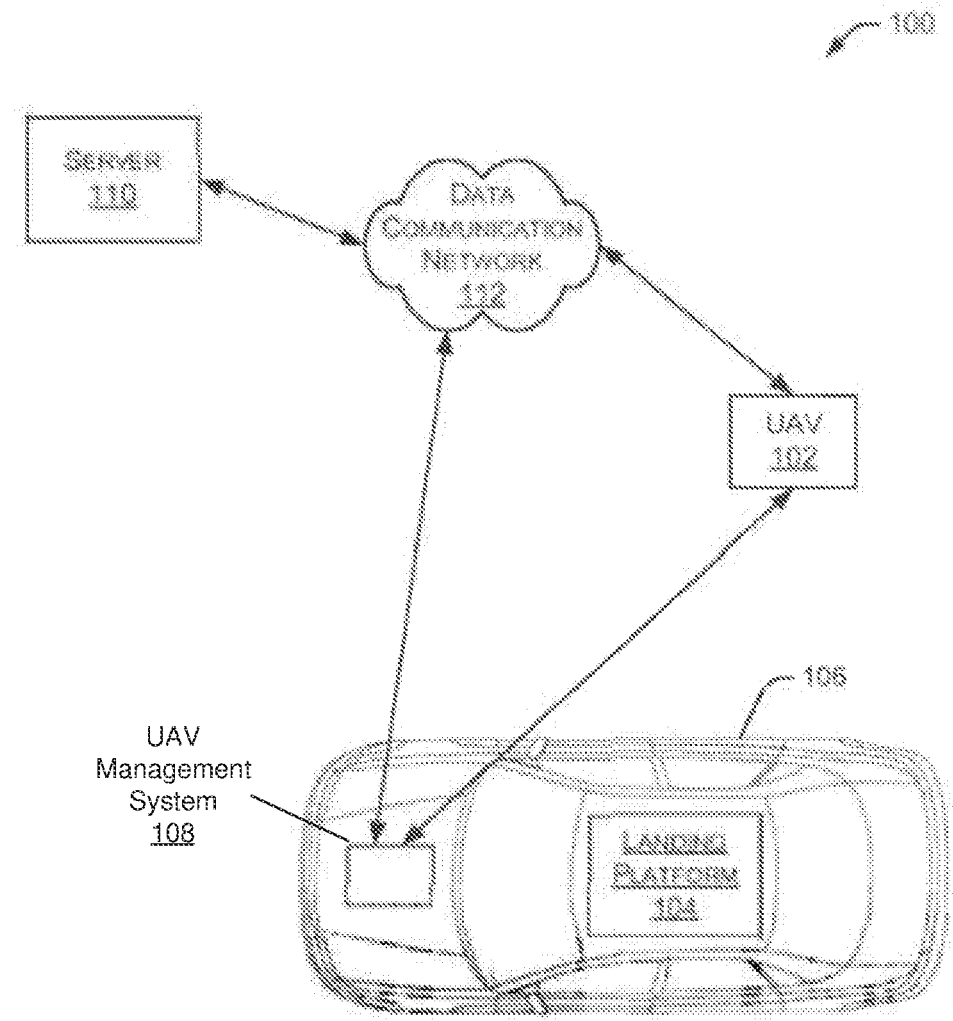
FIG. 1 is a block diagram depicting an environment within which an example embodiment may be implemented.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

FIG. 1 is a block diagram depicting an environment 100 within which an example embodiment may be implemented. An unmanned aerial vehicle (UAV) 102 may land on, and take off from, a landing platform 104 mounted to a vehicle 106 (e.g., mounted to the roof of vehicle 106). Vehicle 106 may be any type of vehicle, such as a car, truck, van, bus, train, and the like. In some embodiments, vehicle 106 may be moving while UAV 102 lands on landing platform 104. In particular implementations, vehicle 106 is a delivery vehicle that carries at least one item to be delivered by UAV 102. In alternate embodiments, landing platform 104 may be mounted to any type of device or structure, such as a building, loading dock, loading platform, and the like. UAV 102 can be any type of unmanned aerial vehicle capable of maneuvering to land on, and take off from, any type of landing platform. In some embodiments, UAV 102 is a multicopter having two or more rotors (e.g., motors) and associated propellers. In particular implementations, UAV 102 has a single rotor and associated propeller. UAV 102 may also be referred to as a drone or a remotely piloted aircraft. As discussed in greater detail herein, landing platform 104 provides a temporary location for UAV 102 to land and receive payload, deliver payload, recharge, "piggy back" on vehicle 106, and the like.

As shown in FIG. 1, vehicle 106 includes a UAV management system 108 that is capable of wirelessly communicating with UAV 102. Any communication protocol may be used for communications between UAV management system 108 and UAV 102, such as 3G, 4G LTE, WiFi and the like. In some embodiments, UAV management system 108 provides flight guidance to UAV 102 when landing on, or taking off from, landing platform 104. Additionally, UAV management system 108 may provide instructions to landing platform 104 to position and orient UAV 102 on landing platform 104, as discussed herein. In some embodiments, UAV management system 108 communicates with a server 110 via a data communication network 112. For example, UAV management system 108 may communicate data associated with UAV 102, vehicle 106, payload, and the like to server 110. Additionally, UAV management system 108 may receive data from server 110 associated with UAV 102, payload delivery instructions, and the like. Other types of data received by UAV management system 108 may include a calculated flight path for UAV 102, temporary flight restrictions, airspace flight restrictions, and localized models of obstructions near the delivery or in the flight path of UAV 102. Data communication network 112 includes any type of network topology using any communication protocol. Additionally, data communication network 112 may include a combination of two or more communication networks. In some embodiments, data communication network 112 includes a cellular communication network, the Internet, a local area network, a wide area network, or any other communication network.

It will be appreciated that the embodiment of FIG. 1 is given by way of example only. Other embodiments may include fewer or additional components without departing from the scope of the disclosure. Additionally, illustrated components may be combined or included within other components without limitation.

Figure 2:
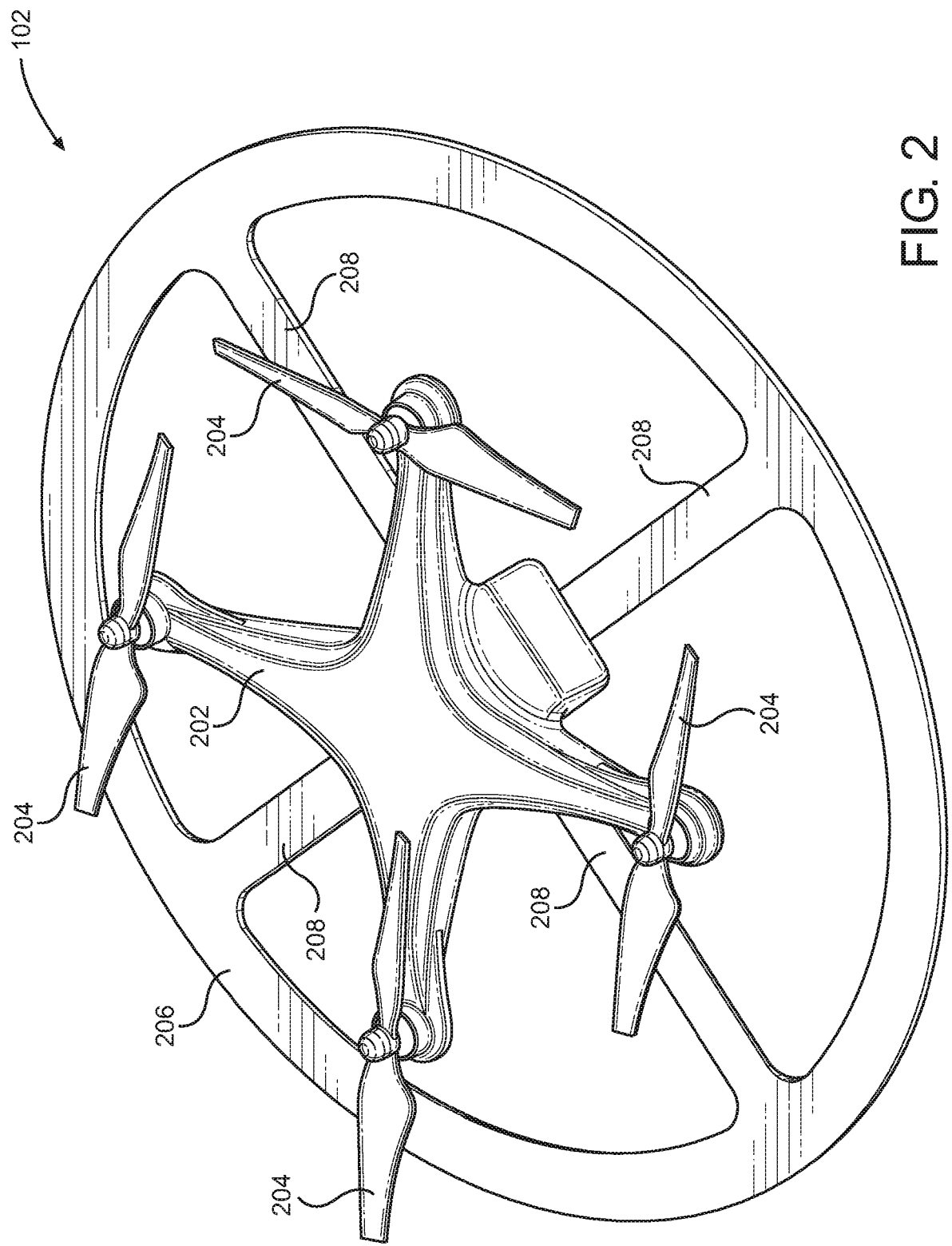
FIG. 2 illustrates an embodiment of an unmanned aerial vehicle.

FIG. 2 illustrates an embodiment of UAV 102. As shown in FIG. 2, UAV 102 includes a body portion 202 that contains multiple rotors (or motors) that drive multiple propellers 204. In this example, body portion 202 contains four rotors that drive four propellers 204. A circular positioning ring 206 is attached to body portion 202 and encircles body portion 202. As discussed herein, positioning ring 206 is used to position and orient UAV 102 after landing on a landing platform, such as landing platform 104. Positioning ring 206 is attached to body portion 202 using multiple support pieces 208. In the example of FIG. 2, four support pieces 208 are used to attach positioning ring 206 to body portion 202. In alternate embodiments, any number of support pieces 208 may be used in any configuration to attach positioning ring 206 to body portion 202. In the example of FIG. 2, positioning ring 206 is located on an opposite side of body portion 202 from the propellers 204 to avoid any contact between positioning ring 206 and propellers 204. In some embodiments, a ring similar to positioning ring 206 is integrated into body portion 202 (e.g., manufactured as part of body portion 202) such that the ring extends from the body or housing of UAV 102. Although positioning ring 206 is circular, in alternate embodiments positioning ring 206 may have other shapes such as an elliptical shape.

Figure 3:
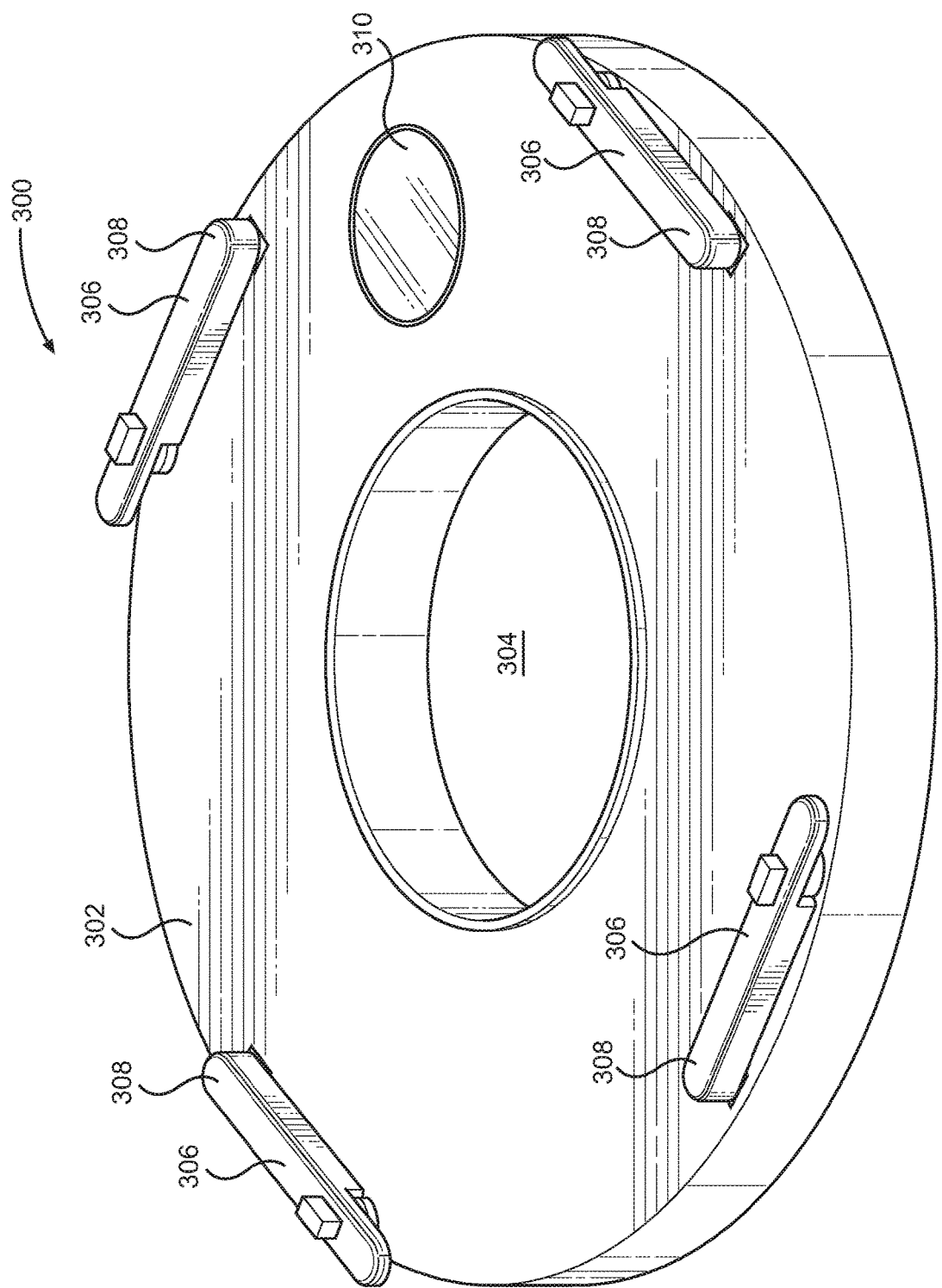
FIG. 3 illustrates an embodiment of a landing platform capable of receiving an unmanned aerial vehicle.

FIG. 3 illustrates an embodiment of a landing platform 300 capable of receiving a UAV. Landing platform 300 includes a base 302 having an aperture (or cavity) 304 in the middle of base 302. In the example of FIG. 3, base 302 is circular. However, in alternate embodiments, base 302 may have any shape. Similarly, aperture 304 shown in FIG. 3 is circular, but alternate embodiments of landing platform 300 may include a base having an aperture of any shape and any size. In some embodiments, the size of aperture 304 is appropriate to load and unload payload carried by a UAV that has landed on landing platform 300.

Landing platform 300 also includes multiple positioning arms 306 attached to base 302. Each positioning arm 306 is rotatable between a locked position and an unlocked position. In the example of FIG. 3, positioning arms 306 are in the unlocked position. When positioning arms 306 are in the unlocked position, vertical movement of the UAV is permitted, such as landing on landing platform 300 or taking off from landing platform 300. When positioning arms 306 are in the locked position (e.g., as shown in FIG. 5), vertical movement of the UAV is prevented. Each positioning arm 306 rotates about a pivot point 308. In some embodiments, positioning arm 306 is rotated by a stepper motor (e.g., stepper motor 402 shown in FIG. 4). Additional details regarding the locking and unlocking of positioning arms 306 are discussed herein. Although the example of FIG. 3 includes four positioning arms 306, alternate embodiments may contain any number of positioning arms.

In some embodiments, landing platform includes a camera 310 attached to base 302. Camera 310 captures images of the UAV to assist with landing and/or take off of the UAV. Additionally, camera 310 may read an identifier code (e.g., a bar code or QR code) on the UAV which identifies, for example, a type of UAV, settings associated with the UAV, positioning settings associated with the UAV, and orientation settings associated with the UAV. In some embodiments, NFC (near field communication) or BLE (Bluetooth Low Energy) communication systems are used to communicate an identifier code from the UAV to landing platform 300 or UAV management system 108. Alternatively, one or more IR LEDs on the UAV may communicate with one or more IR receivers in landing platform 300. In particular implementations, one or more magnetic switches are used to determine an orientation of the UAV on landing platform 300.

Figure 4:
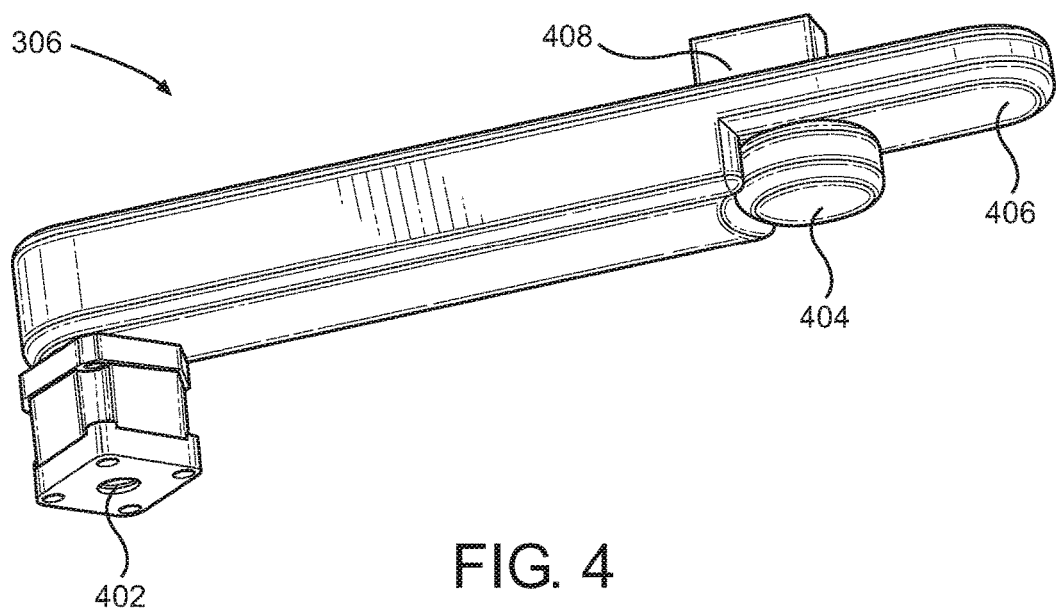
FIG. 4 illustrates an example of a positioning arm associated with the landing platform.
Figure 5:
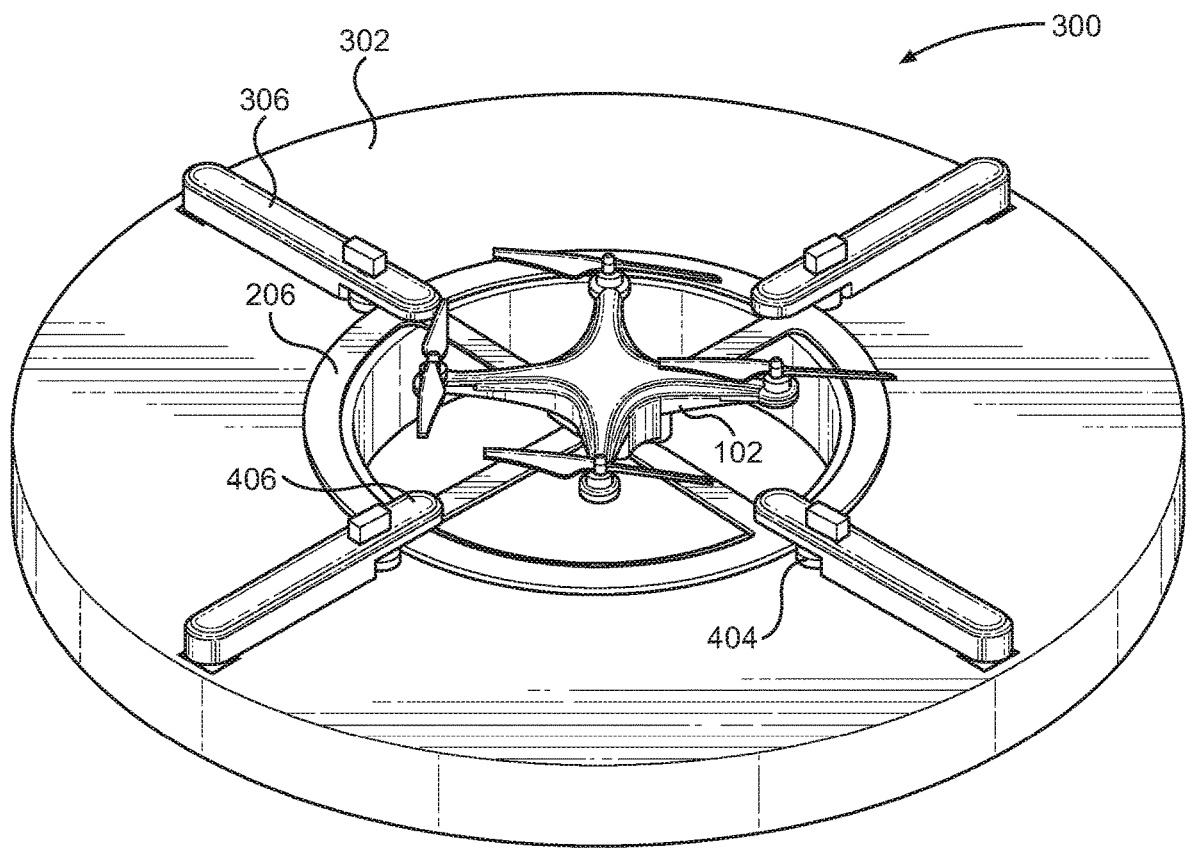
FIG. 5 illustrates an example of an unmanned aerial vehicle secured to a landing platform.

FIG. 4 illustrates an example of positioning arm 306 associated with a landing platform. Positioning arm 306 includes a stepper motor 402 that causes positioning arm 306 to pivot (or rotate) between a locked position and an unlocked position. Any type of motor or other mechanism may be used to pivot positioning arm 306 between the locked and unlocked positions. Positioning arm 306 also includes a wheel 404 that is configured to engage with a positioning ring 206 on UAV 102. Wheel 404 is attached to positioning arm 306 and can be rotated to cause movement of positioning ring 206 that is in physical contact with wheel 404. In some embodiments, wheel 404 is rotated by a continuous rotation servo motor 408. Alternatively, any type of motor or other mechanism may be used to rotate wheel 404. In some embodiments, wheel 404 is manufactured using a material such as rubber or silicone such that a significant friction exists between wheel 404 and positioning ring 206. This friction is necessary to allow the movement of wheel 404 to move positioning ring 206, which causes the rotation of UAV 102. In other implementations, wheel 404 is manufactured using any rough and/or high-friction material, such as rough wood, rough metal, rough leather, and the like. Positioning arm 306 further includes an overhang portion 406 that extends over and beyond wheel 404. The overhang portion 406 provides a gap for positioning ring 206. When positioning arm 306 is in the locked position (e.g., as shown in FIG. 5), positioning ring 206 is located between the landing platform and overhang portion 406. Thus, overhang portion 406 prevents positioning ring 206 from moving away from the landing platform. Additionally, overhang portion 406 maintains positioning ring 206 in a location that contacts wheel 404.

FIG. 5 illustrates an example of UAV 102 secured to landing platform 300. In the example of FIG. 5, the four positioning arms 306 are in the locked position which secures UAV 102 to landing platform 300 and prevents vertical movement of UAV 102. As shown in FIG. 5, UAV 102 is approximately centered on landing platform 300, which allows access to the bottom of UAV 102 from below landing platform 300 (through the aperture in landing platform 300). For example, payload (not shown) may be loaded or unloaded through the aperture or a UAV recharging connection system (not shown) may be established through the aperture. Additionally, UAV maintenance or repair may be performed through the aperture or from above landing platform 300.

In the example of FIG. 5, overhang portion 406 of each positioning arm 306 secures positioning ring 206 to base 302 of landing platform 300. Additionally, each wheel 404 of each positioning arm 306 is in contact with positioning ring 206. Thus, when wheels 404 of positioning arms 306 are rotated, they cause UAV 102 to rotate on base 302. This rotation (e.g., reorienting of UAV 102) may be necessary to properly orient UAV 102 to load/unload payload, access a UAV recharging system, and the like.

When landing UAV 102 on landing platform 300, positioning arms 306 are initially in the unlocked position (e.g., as shown in FIG. 3). After landing, UAV 102 may not be centered over the aperture in base 302. As the positioning arms 306 rotate from the unlocked position to the locked position, wheels 404 will contact positioning ring 206 and cause the UAV 102 to slide toward the center of base 302 as positioning arms continue moving toward the locked position. In some embodiments, the length of positioning arms 306 and the placement of wheels 404 are determined based on the size (e.g., diameter) of positioning ring 206. After UAV 102 is centered on base 302, wheels 404 are rotated, if necessary, to reorient UAV 102 to load/unload payload, access a UAV recharging system, and the like.

In some embodiments, landing platform 300 may accommodate UAVs 102 with different sizes (e.g., diameters) of positioning rings 206. To accommodate different sizes of positioning rings 206, each positioning arm 306 has a variable length (such as a spring-loaded portion) that adjusts to properly align with a particular positioning ring 206. In other embodiments, different sizes of positioning rings 206 are accommodated by rotating all positioning arms 306 at the same time and at the same rate of rotation. When all positioning arms 306 have contacted positioning ring 206 (e.g., stopped moving), UAV 102 can be rotated (if necessary) by rotating wheels 404 of positioning arms 306.

Figure 6:
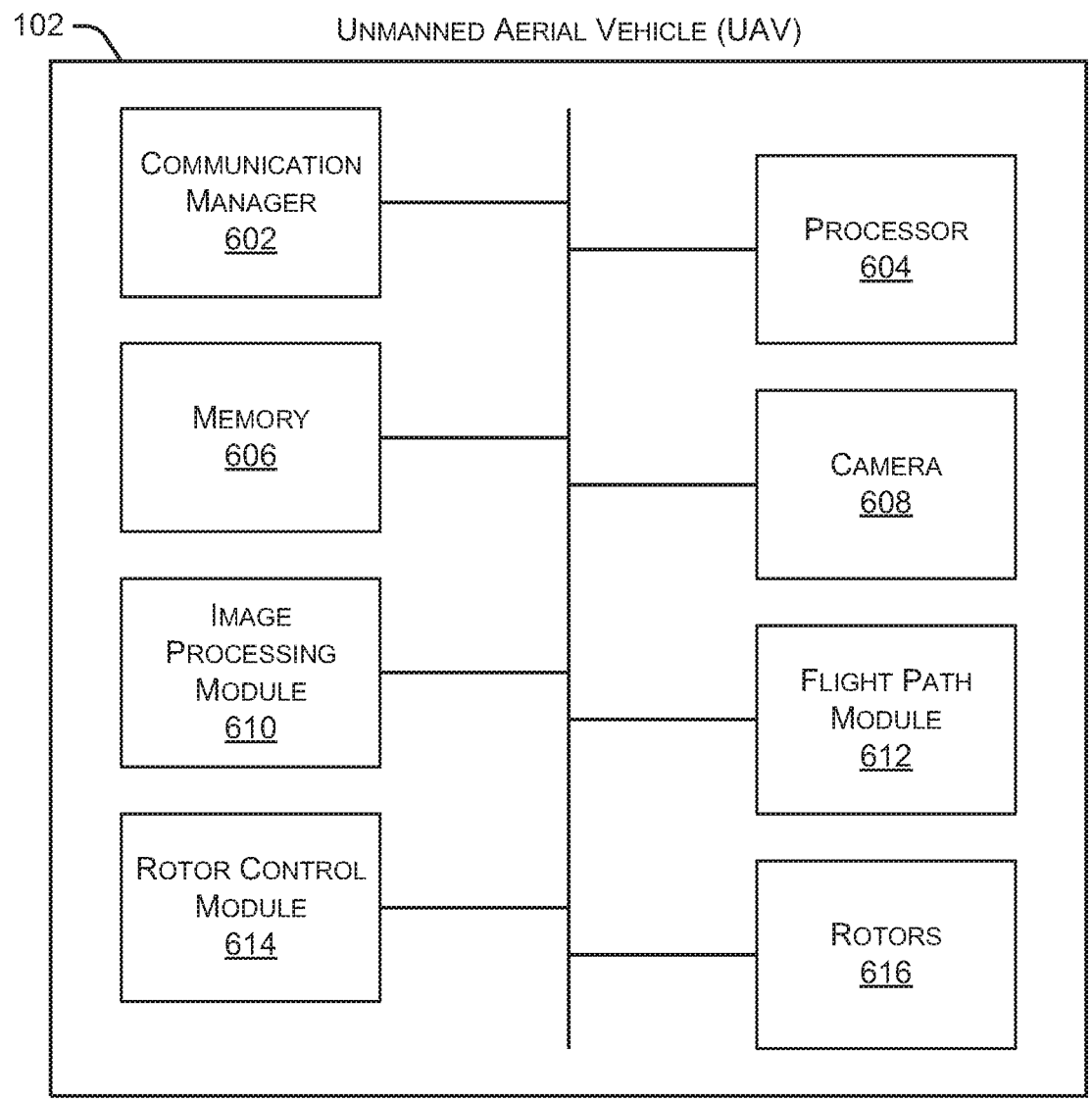
FIG. 6 is a block diagram illustrating an embodiment of an unmanned aerial vehicle.

FIG. 6 is a block diagram illustrating an embodiment of UAV 102. As shown in FIG. 6, UAV 102 includes a communication manager 602, a processor 604, and a memory 606. Communication manager 602 allows UAV 102 to communicate with other systems, such as UAV management system 108, server 110, data communication network 112, and the like. Processor 604 executes various instructions to implement the functionality provided by UAV 102, as discussed herein. Memory 606 stores these instructions as well as other data used by processor 604 and other modules and components contained in UAV 102.

UAV 102 also includes a camera 608 that captures images of the areas near UAV 102. In some embodiments, an image processing module 610 analyzes images captured by camera 608 to locate landing platforms, delivery areas, obstacles, and the like. Additionally, image processing module 610 may assist with landing UAV 102 by identifying a landing platform (or other delivery area) location and determining flight adjustments needed to successfully land UAV 102 on the landing platform. A flight path module 612 generates and maintains information related to a flight path that UAV 102 attempts to follow. In some embodiments, the flight path information is received from UAV management system 108 or server 110. A rotor control module 614 controls the operation of multiple rotors 616 associated with UAV 102. In some embodiments, UAV 102 has three or four rotors 616 that assist UAV 102 in flying between multiple locations. For example, rotor control module 614 may control the rotational speed of each rotor 616 to steer and maneuver UAV 102 to a destination, such as a landing platform or delivery location. Thus, rotor control module 614 can assist in maneuvering UAV 102 along a particular flight path, avoiding obstacles, and the like. In particular embodiments, one or more of the functions performed by rotor control module 614 are, instead, performed by UAV management system 108 or server 110, which sends appropriate rotor control instructions to rotor control module 614 for implementation.

Figure 7:
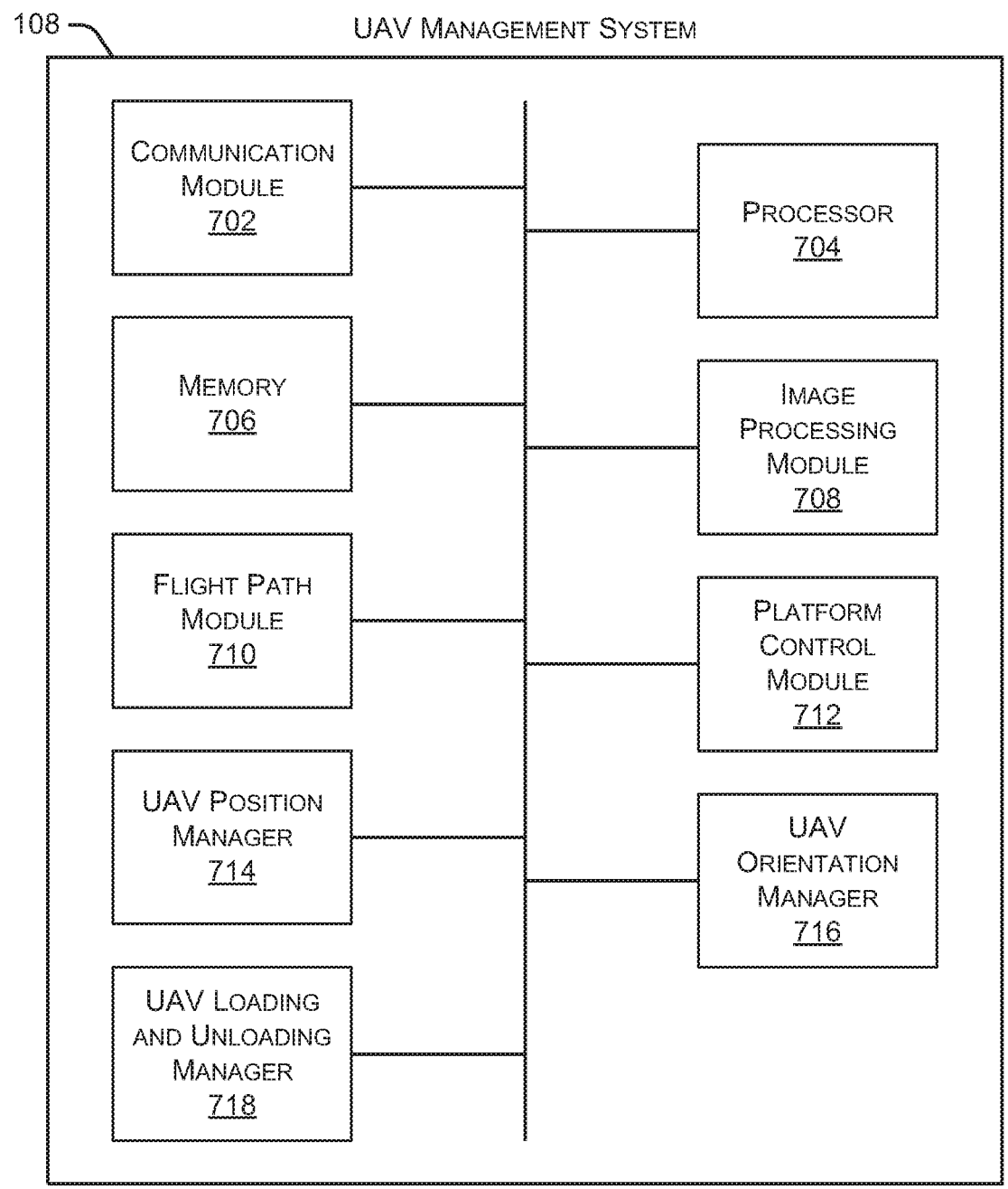
FIG. 7 is a block diagram illustrating an embodiment of a UAV management system.

FIG. 7 is a block diagram illustrating an embodiment of UAV management system 108. As shown in FIG. 7, UAV management system 108 includes a communication module 702, a processor 704, and a memory 706. Communication module 702 allows UAV management system 108 to communicate with other systems and devices, such as UAV 102, server 110, data communication network 112, and the like. Processor 704 executes various instructions to implement the functionality provided by UAV management system 108, as discussed herein. Memory 706 stores these instructions as well as other data used by processor 704 and other modules and components contained in UAV management system 108.

UAV management system 108 also includes an image processing module 708 that analyzes images captured, for example, by camera 608 (in UAV 102) or camera 310 in landing platform 300. Image processing module 708 may assist with landing UAV 102 by identifying the location and trajectory of UAV 102 with respect to landing platform 300, and determining flight adjustments needed to successfully land UAV 102 on landing platform 300. A flight path module 710 generates and maintains information related to a flight path that UAV 102 attempts to follow.

A platform control module 712 manages the operation of landing platform 300, such as locking UAV 102 to landing platform 300 and unlocking UAV 102 for take off from landing platform 300. Platform control module 712 may also control the rotation of positioning arms 306 and the rotation of wheels 404 to reorient UAV 102 if needed. In some embodiments, platform control module 712 also determines an identifier associated with UAV 102 and makes any necessary adjustment to landing platform 300 based on the identifier. A UAV position manager 714 may work in combination with platform control module 712 to reposition UAV 102 so it is centered on landing platform 300. A UAV orientation manager 716 adjusts the orientation of UAV 102, if necessary, so it is oriented properly to load/unload payload, access a UAV recharging system, and the like. A UAV loading and unloading manager 718 assists with the loading and unloading of payload carried by UAV 102.

Figure 8:
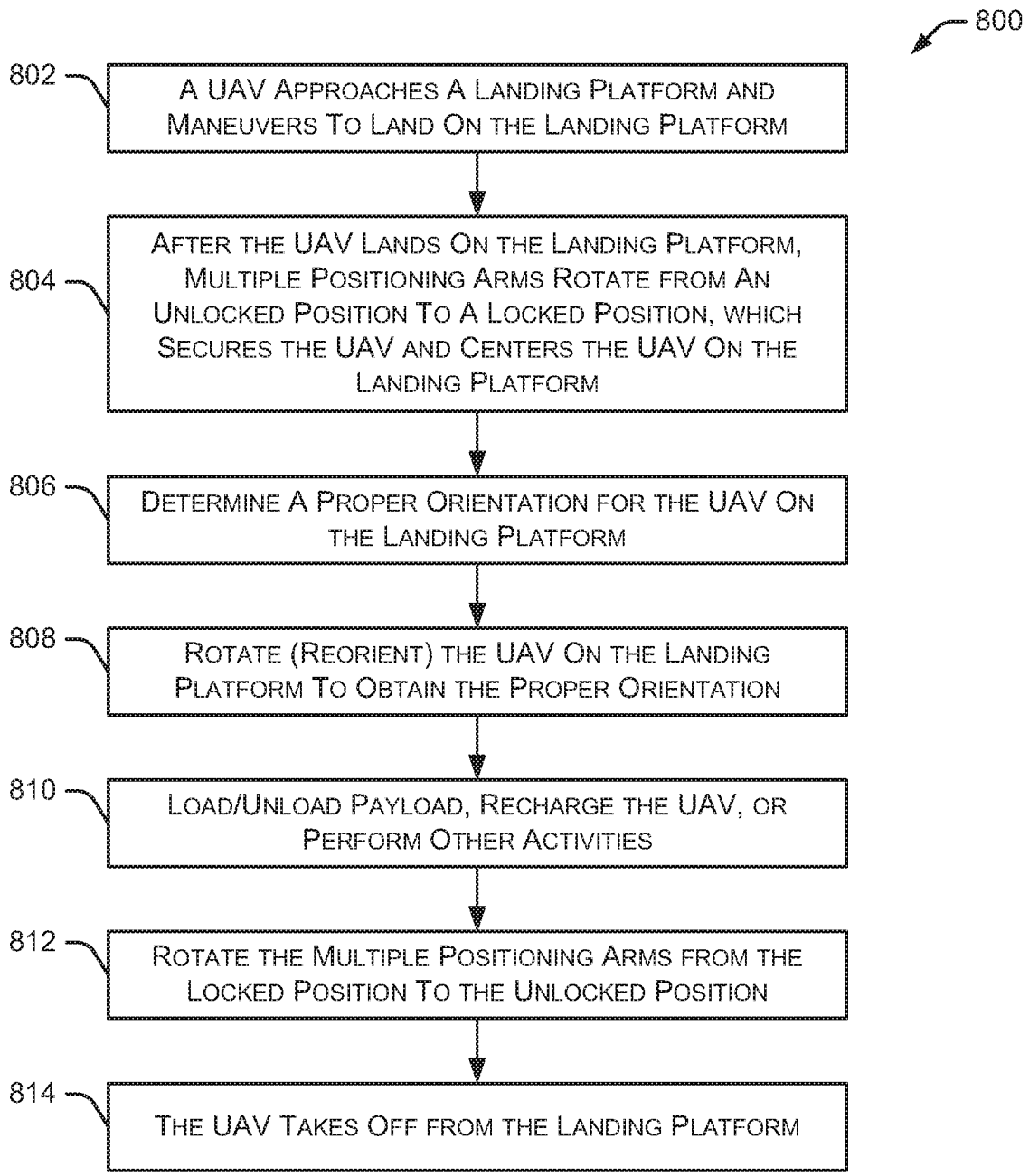
FIG. 8 is a flow diagram illustrating an embodiment of a method for landing, securing, positioning, and orienting an unmanned aerial vehicle on a landing platform.

FIG. 8 is a flow diagram illustrating an embodiment of a method 800 for landing, securing, positioning, and orienting a UAV on a landing platform. Initially, a UAV approaches 802 a landing platform and maneuvers to land on the landing platform. After the UAV lands on the landing platform, multiple positioning arms rotate 804 from an unlocked position to a locked position, which secures the UAV to the landing platform and centers the UV on the landing platform. Method 800 then determines 806 a proper orientation for the UAV on the landing platform. For example, the proper orientation may allow loading or unloading of payload, access a UAV recharging system, and the like. Wheels on the multiple positioning arms are rotated 808 to rotate (i.e., reorient) the UAV on the landing platform to obtain the proper orientation of the UAV. Once the UAV is properly oriented on the landing platform, one or more activities are performed 810, such as loading/unloading payload, recharging the UAV, and the like. When the activities are completed, the multiple positioning arms are rotated 812 from the locked position to the unlocked position and the UAV takes off 814 from the landing platform.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A landing platform comprising:
   a base having an aperture therethrough;
   a plurality of positioning arms rotatably attached to the base, wherein each of the plurality of positioning arms can rotate between an unlocked position and a locked position, and wherein each of the plurality of positioning arms are configured to engage a positioning ring on an unmanned aerial vehicle (UAV) and further configured to reposition the UAV on the base; and
   a processor configured to:
      read an identifier code on the UAV; and
      determine a proper orientation of the UAV on the landing platform, wherein determining the proper orientation of the UAV on the landing platform includes determining the proper orientation based on the identifier code.

2. The landing platform of claim 1, wherein the landing platform is configured to reinforce the UAV on the base such that the UAV is properly aligned to load or unload a payload through the aperture or recharge the UAV.

3. The landing platform of claim 1, wherein each of the plurality of positioning arms includes a wheel that engages the positioning ring on the UAV.

4. The landing platform of claim 3, wherein rotation of the wheel on at least one of the positioning arms causes movement of the positioning ring, which reorients the UAV on the base.

5. The landing platform of claim 3, wherein each of the plurality of positioning arms includes a continuous rotation servo motor configured to rotate the wheel.

6. The landing platform of claim 1, wherein when the plurality of positioning arms are in the unlocked position vertical movement of the UAV is permitted, and when the plurality of positioning arms are in the locked position vertical movement of the UAV is prevented.

7. The landing platform of claim 1, wherein the landing platform is configured to position the UAV to be centered over the aperture.

8. The landing platform of claim 1, further comprising a camera attached to the base and configured to read at least one identifier code on the UAV, wherein the identifier code identifies at least one of a type of UAV, settings associated with the UAV, positioning settings associated with the UAV, and orientation settings associated with the UAV.

9. The landing platform of claim 8, wherein the plurality of positioning arms reposition the UAV on the base based on the identifier code.

10. The landing platform of claim 1, wherein the landing platform is mounted to a delivery vehicle that carries at least one item to be delivered by the UAV.

11. The landing platform of claim 1, wherein each of the plurality of positioning arms further includes a stepper motor configured to rotate the positioning arm between the locked position and the unlocked position.

12. A method comprising:
   receiving an unmanned aerial vehicle (UAV) on a landing platform;
   rotating a plurality of positioning arms from an unlocked position to a locked position, wherein the plurality of positioning arms engage a positioning ring on the UAV in the locked position;
   reading an identifier code on the UAV;
   determining a proper orientation of the UAV on the landing platform, wherein determining the proper orientation of the UAV on the landing platform includes determining the proper orientation based on the identifier code; and
   rotating a wheel on each of the plurality of positioning arms to adjust the orientation of the UAV to the proper orientation.

13. The method of claim 12, wherein the UAV is secured to the landing platform when the plurality of positioning arms are in the locked position.

14. The method of claim 12, further comprising:
   loading or unloading payload carried by the UAV; and
   rotating the plurality of positioning arms from the locked position to the unlocked position to release the UAV from the landing platform.

15. The method of claim 12, wherein rotating the plurality of positioning arms from the unlocked position to the locked position includes activating a stepper motor associated with each of the plurality of positioning arms.

16. The method of claim 12, wherein the identifier code identifies at least one of a type of UAV, settings associated with the UAV, positioning settings associated with the UAV, and orientation settings associated with the UAV.

* * * * *